United States Patent [19]
Timko et al.

[11] 4,123,698
[45] Oct. 31, 1978

[54] INTEGRATED CIRCUIT TWO TERMINAL TEMPERATURE TRANSDUCER

[75] Inventors: Michael P. Timko; Adrian P. Brokaw, both of Burlington, Mass.

[73] Assignee: Analog Devices, Incorporated, Norwood, Mass.

[21] Appl. No.: 703,087

[22] Filed: Jul. 6, 1976

[51] Int. Cl.$^2$ .................. G05F 1/58; H01L 19/00
[52] U.S. Cl. .................... 323/1; 307/299 B; 323/19; 323/68; 357/44; 357/51; 330/289
[58] Field of Search .................. 323/1, 4, 9, 22 T; 330/30 D, 252, 256, 288, 289; 307/279, 297, 299 B; 357/44, 51, 44.51

[56] References Cited

U.S. PATENT DOCUMENTS

| | | | |
|---|---|---|---|
| 3,624,423 | 11/1971 | Borgini | 307/279 |
| 3,624,454 | 11/1971 | Adkinson et al. | 357/51 |
| 3,846,696 | 11/1974 | Ahmed | 323/1 |
| 3,886,435 | 5/1975 | Steckler | 323/9 |
| 3,911,353 | 10/1975 | van de Plassche | 323/9 |
| 3,914,683 | 10/1975 | van de Plassche | 323/1 |
| 3,982,172 | 9/1976 | van de Plassche | 323/1 |
| 4,028,564 | 6/1977 | Streit et al. | 357/44 |

FOREIGN PATENT DOCUMENTS

| | | | |
|---|---|---|---|
| 2,157,756 | 6/1972 | Fed. Rep. of Germany | 323/4 |
| 1,373,133 | 11/1974 | United Kingdom | 323/1 |
| 1,374,122 | 11/1974 | United Kingdom | 323/1 |

*Primary Examiner*—Gerald Goldberg
*Attorney, Agent, or Firm*—Parmelee, Johnson, Bollinger & Bramblett

[57] ABSTRACT

An integrated circuit two terminal temperature transducer providing an accurate current output that is linearly related to absolute temperature over an extended temperature range. The circuit is of the type using first and second transistors having conductive areas of different sizes, and control transistors for supplying equal currents through the first and second transistors to operate them at different current densities, and a resistor responsive to the base-to-emitter voltages of the first and second transistors for developing currents therethrough proportional to absolute temperature. Improved accuracy over an extended temperature range is provided in a two terminal device by means of a third transistor coupled to the first and second transistors to generate another controlled current varying linearly with absolute temperature to be combined with the currents through the first and second transistors to form an output current. Bias currents used by control transistors are directed through the third transistor to compel the bias currents to become components of the controlled current. Similarly, the integrated circuit substrate is connected to direct the substrate leakage current through the third transistor to compel the leakage current to become a component of the output current. Accordingly, bias current and substrate leakage current do not erroneously affect the output current.

36 Claims, 5 Drawing Figures

INTEGRATED CIRCUIT TWO TERMINAL TEMPERATURE TRANSDUCER

BACKGROUND OF THE INVENTION

1. Field of the Invention

This invention relates to temperature sensing devices, and more particularly to such devices using the temperature sensitive properties of transistors. The present invention also relates to integrated circuit devices designed to generate a controlled output current over a wide temperature range and subject to substrate leakage.

2. Description of the Prior Art

A variety of temperature devices are known. Standard devices, such as thermocouples, thermistors, or RTD's, all have limitations which prevent them from being easily or widely used. Thermocouples require accurate cold junction compensation, some form of linearization, and produce a low level voltage output which is subject to electrical noise interference. Resistance thermometers and thermistors have a non-linear characteristic which requires careful compensation and a wide dynamic electrical range. In addition, making a good resistance measurement demands an accurate voltage source, low level precision current sensing, and careful lead compensation. These devices also require strict attention to lead wire material connections. Initial calibration on all these devices is also a problem especially when field replacement is necessary.

Another known form of temperature sensing is based upon the capability of a transistor to generate a base-to-emitter voltage proportional to absolute temperature, accurate over a wide temperature range. One previous attempt to use this property has employed means for amplifying and buffering the voltage signal and providing necessary support circuitry, such as a voltage regulator, on the same integrated circuit chip. This arrangement, however, is useful over only a limited temperature range, and because of large power consumption requirements is subject to self heating effects which interfere with the temperature sensing function.

Another approach to using the linear Vbe versus temperature property of a transistor to form a temperature sensing device is disclosed in U.S. Pat. No. 3,940,760 to Brokaw. This device, illustrated herein in FIG. 1, generates an output current $I_T$ varying with absolute temperature by means of first and second transistors Q1 and Q2 operated at a constant ratio of emitter current densities and having their bases interconnected and the difference between their Vbe's impressed across a resistor R. In the transistors Q1 and Q2, the equation for emitter current density is given by:

$$Je = Js\, e^{qVbe/kT}$$

where Js is the saturation current density, $q$ is the charge in coulombs of an electron, $k$ is Boltzman's constant, and T is absolute temperature in degrees Kelvin. For two transistors at current densities J1 and J2:

$$Vbe1 = \left(\frac{kT}{q}\right)\ln\frac{Je1}{Js} \text{ and }$$

$$Vbe2 = \left(\frac{kT}{q}\right)\ln\frac{Je2}{Js}$$

The difference voltage $V_T$ is given by:

$$V_T = Vbe1 - Vbe2 = \left(\frac{kT}{q}\right)\ln\frac{Je1}{Je2}$$

Thus, if Je1/Je2 is a constant $r$, not equal to one, then $$V_T = T\left(\frac{k}{q}\ln r\right)$$

In the circuit of FIG. 1, a constant ratio of emitter current densities is achieved by providing the first and second transistors Q1 and Q2 with emitter conductive areas of different sizes, and by using additional transistors Q3 and Q4 connected to the collectors of transistors Q1 and Q2, together with diode connections across transistors Q2 and Q3, in order to supply currents through transistors Q1 and Q2. Assuming that the transistor collector currents are dependent only on Vbe and base currents are zero (i.e., $\beta$ = infinity), then equal currents Ic1 = Ic2 are forced through transistors Q1 and Q2. Assuming the emitter conductive areas of transistors Q1 and Q2 are in a ratio $r$, the ratio of emitter current densities also will be $r$, and the difference voltage $V_T$ is directly proportional to absolute temperature. The voltage $V_T$ appears across resistor R and determines the level of current flowing through transistor Q1. The output current $I_T$ drawn by both sides of the circuit is $$I_T = 2\frac{V_T}{R} = \left(2\frac{k\ln r}{q}\right)\frac{T}{R}$$

If the resistor R has a zero temperature coefficient, then $I_T$ is also directly proportional to absolute temperature, and appropriate selection of the emitter ratio $r$ and resistance R will provide an output current accurately related to temperature with a predetermined constant of proportionality, useful for absolute temperature sensing purposes.

While the circuit of FIG. 1 provides basically advantageous characteristics for use as a temperature sensing device, it would be desirable to effect performance improvements for certain applications, e.g. for extremely accurate temperature sensing, especially over wide temperature ranges. In the circuit of FIG. 1, high accuracy depends upon the achievement of equal currents through the first and second transistors Q1 and Q2 which equality, however, cannot precisely be achieved due to the finite $\beta$ of real components, and due to the Early effect error arising from the diode connected transistors (for a larger collector-base voltage, the base region becomes narrower because the collector depletion layer widens and the reduction of base thickness permits more emitter current to reach the collector for a fixed emitter-base voltage such that both emitter and collector currents are increased). In addition, the output $I_T$ of the circuit of FIG. 1 is a variable current, and when the circuit is realized in integrated circuit form, it has been found that over large temperature ranges, substrate leakages (i.e., across isolation pockets) produce leakage currents which affect the linearity of the output.

SUMMARY OF THE INVENTION

It is a principal object of this invention to provide an improved temperature sensing circuit of the type passing equal currents through first and second transistors having conductive areas of different sizes, with resistive means being responsive to the difference in the base-to-emitter voltages to develop an output current. More specific objects of the invention are to provide such a temperature sensing circuit which is capable of more linear operation, which operates over a wider temperature range, which can be manufactured using straightforward integrated circuit processing techniques, which can be calibrated accurately, and which can be placed in a small package. Still another object of this invention is to provide such a temperature sensing circuit which is useful as a remote sensor and capable of operating as a two terminal device with a minimum of self heating. Still another object of the invention is to provide such a temperature sensing device which is more suitable for practical, commercial use in a variety of applications.

In a preferred embodiment of the invention to be described hereinbelow in detail, the circuit is of the type utilizing first and second transistors having conductive areas of different sizes, means such as complementary transistors connected to the collectors of the first and second transistors to supply current therethrough, and means for controlling the current supplying means to equalize the currents through the first and second transistors and operate them at different current densities, thereby to produce different base-to-emitter voltages in the first and second transistors. Resistive means respond to the difference in the base-to-emitter voltages of the first and second transistors to develop current therethrough corresponding to the difference in the base-to-emitter voltages. In accordance with the present invention, currents through the first and second transistors are equalized by transistor control means, such as a differential pair, carrying bias current. A means, such as a third transistor connected in common with the first and second transistors, generates a controlled current varying linearly with absolute temperature to be combined with the current through the first and second transistors to form the output current. The bias current from the transistor control means is directed through the controlled current means to compel the bias current to become a component of the controlled current, rather than an addition thereto, and thus the bias current through the transistor control means does not erroneously affect the output current. In another aspect of the invention, wherein the circuit is formed with integrated circuit techniques, the integrated circuit substrate is connected to the controlled current generating means to direct the substrate leakage current therethrough to compel the leakage current also to become a component of the output current rather than an addition thereto, and thus the substrate leakage current similarly does not erroneously affect the linearity of the output current. Accordingly, improved accuracy can be achieved, and extended temperature ranges can be achieved, without causing bias current error or substrate leakage current error to mask the linearly varying signal current.

In further aspects of the invention, all current paths through one input terminal of the device include diode junctions protecting the circuit against reverse polarity connections, and the resistive means is made from trimmable thim film material permitting the output current to be calibrated by laser trimming to achieve precise current-temperature relationships.

Other objects, aspects and advantages of the invention will be pointed out in, or apparent from, the following description of the preferred embodiments considered together with the following drawings.

DESCRIPTION OF THE PREFERRED EMBODIMENTS

Figure 2:
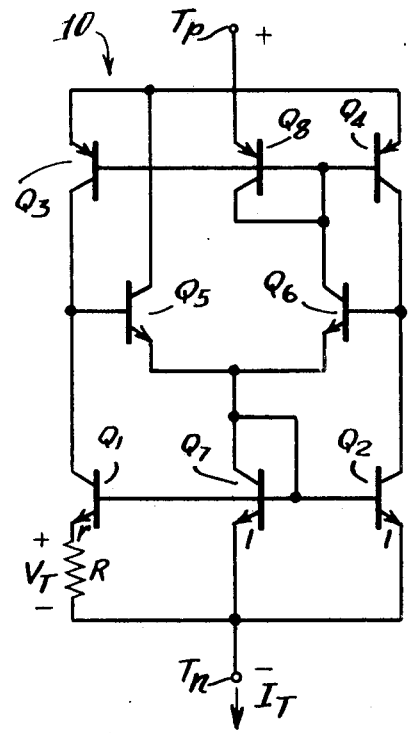
FIG. 2 is a schematic diagram illustrating, in simplified form, a circuit constructed in accordance with the present invention to provide improved current equality.

FIG. 2 shows a two terminal temperature transducer 10 which is shown in a simplified form for the purpose of illustration and which is arranged to provide improved linearity by improving the equality of the currents through first and second transistors Q1 and Q2 having different emitter conductive areas in a ratio $r$. As shown in FIG. 2, transistors Q1 and Q2 have complementary transistors Q3 and Q4 connected to their collectors to supply current thereto. A differential pair of transistors Q5 and Q6 is provided to compare the currents flowing through the first and second transistors Q1 and Q2 and to control the current-supplying transistors Q3 and Q4 in order to equalize the currents. As shown, the transistor Q5 has its base-to-emitter circuit connected across the collector-to-base circuit of the first transistor Q1, and has its collector connected to the positive input terminal Tp, and the transistor Q6 has its base-to-emitter circuit connected across the collector-to-base circuit of the second transistor Q2, and has its collector connected to the interconnected bases of the current-supplying transistors Q3 and Q4. Accordingly, any difference arising between the currents through the first and second transistors will cause the magnitude of the current flowing through the two halves of the circuit to be adjusted in a direction causing the currents to become more nearly equal.

The collector currents of transistors Q1 and Q3 will equal the collector currents of transistors Q2 and Q4 assuming only that the base currents and Vbe's of transistors Q5 and Q6 are equal. In the circuit of FIG. 2, equal base currents and Vbe's of transistors Q5 an Q6 are obtained by passing substantially equal bias currents through the differential transistors Q5 and Q6 in a way that does not allow the bias currents to distort the temperature dependence of the output current $I_T$. As shown in FIG. 2, a third transistor Q7 having its base and emitter connected in common with the base and emitter of the second transistor Q2 is provided. The transistor Q7 is diode connected and has its collector connected to the common emitters of transistors Q5 and Q6 and thus carries the total bias current passed therethrough. Since the Vbe of transistor Q7 is the same as the Vbe of transistor Q2, their emitter currents will be equal with the exception of the Early effect error due to the higher Vcb of Q2. The current through transistor Q7, however, varies linearly with absolute temperature, and it is combined with the currents through transistors Q1 and Q2 at negative terminal Tn to form the output current $I_T$. Accordingly, the bias currents through transistors Q5 and Q6, because they are directed through transistor Q7, are compelled to become a component of a linearly varying temperature dependent current and do not erroneously affect the output current.

Figure 1:
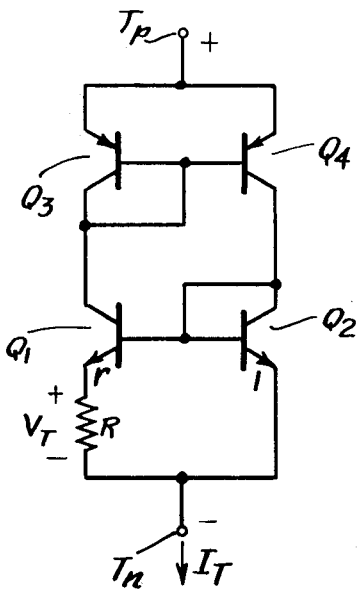
FIG. 1 is a schematic diagram of the prior art circuit described above.

Substantially equal bias currents through transistors Q5 and Q6 are obtained by transistor Q8 in the collector circuit of transistor Q6. Transistor Q8 has its emitter area in a ratio of 1:2 to the areas of transistors Q3 and Q4 so that half the current which flows through either transistor Q3 or Q4 will flow through transistor Q8 into transistor Q6. Since the total current through transistor Q7 is substantially the same as the currents through transistors Q1 or Q2, the bias currents in transistors Q5 and Q6 are nearly equal. The Early effect error arising between transistors Q8 and either Q3 or Q4 due to the diode connection of transistor Q8, and the Early effect error between transistor Q7 and either transistor Q1 or Q2 due to the diode connection of transistor Q7, prevents the circuit of FIG. 2 from being completely accurate, but the effect of these errors on the equalization of currents through transistors Q1 and Q2 is reduced by a factor of the $\beta$ of NPN transistors Q5 and Q6 from the comparable effects on the prior art circuit of FIG. 1. In typical integrated circuit technology, NPN $\beta$'s of about 400 are obtainable, and thus the circuit of FIG. 2 has the linearity of its output current $I_T$ improved by a factor of 400 without at the same time introducing counterbalancing errors arising from the circuitry used to improve accuracy.

Figure 3:
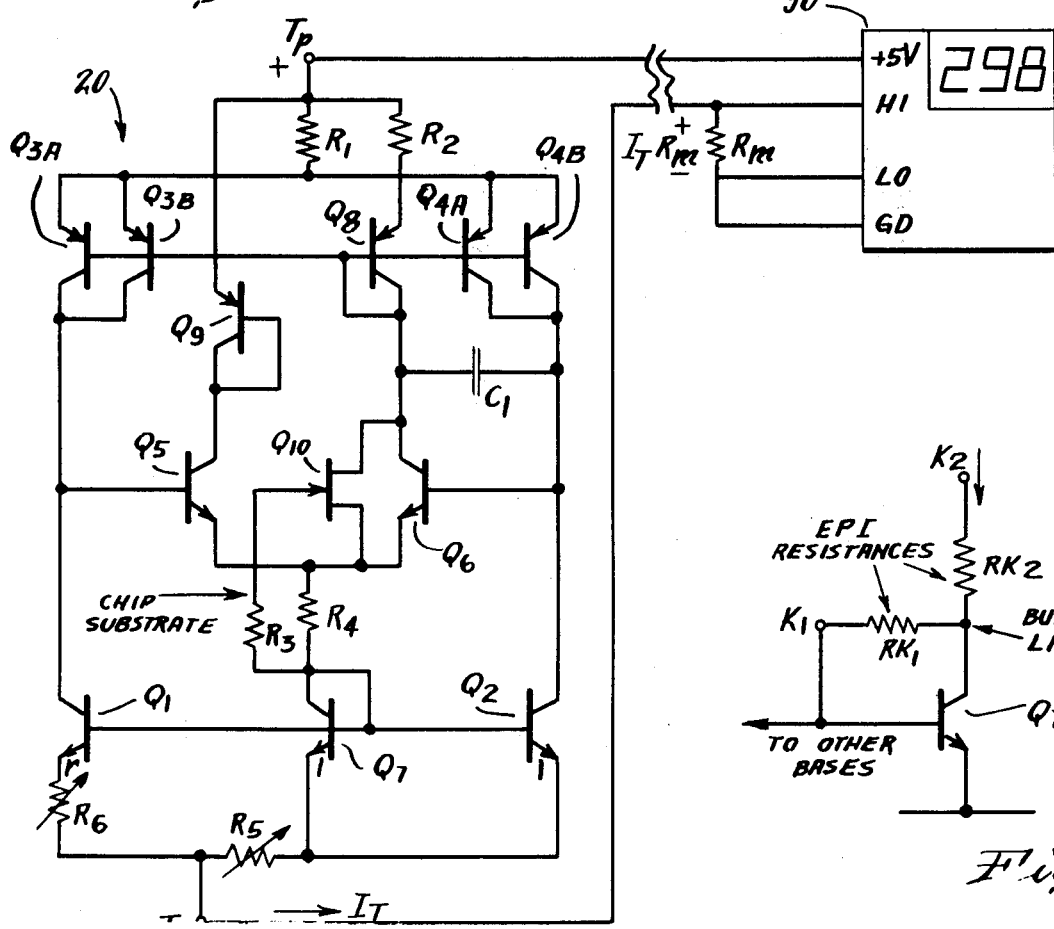
FIG. 3 is a schematic diagram of an integrated circuit two terminal temperature transducer in accordance with the present invention.

FIG. 3 illustrates a two terminal temperature transducer circuit 20 including additional components for improving the performance of the circuit. The circuit 20 of FIG. 3 uses four current supplying transistors Q3A, Q3B and Q4A, Q4B in place of transistors Q3 and Q4. The emitter area of transistor Q8 setting the level of bias current through transistor Q6 may be the same as the emitter areas of transistors Q3A, Q3B, Q4A, and Q4B. Resistors R1 and R2, having a resistance ratio of 1 to 4, connect the positive terminal Tp respectively to the emitters of transistors Q3A, Q3B, Q4A, Q4B and to the emitter of transistor Q8 to reduce the Early effect error arising between diode connected transistor Q8 and the four current supplying transistors Q3A, Q3B, Q4A and Q4B. A second diode connected PNP transistor Q9 appears in the collector circuit of differential transistor Q5 to balance the collector voltages of transistors Q5 and Q6 and, in addition, to provide a forward PN diode junction in every current path from terminal Tp to provide protection against reverse biasing of circuit 20.

A frequency selective circuit formed with resistor R4 and capacitor C1 provides frequency compensation in the feedback loop through transistors Q5 and Q6, prevents the circuit from oscillating, and provides stability for the overall circuitry. As shown, the capacitor C1 couples the output of current supplying transistors Q4A and Q4B to the collector of transistor Q6 which senses their output current, and resistor R4 couples the emitters of transistors Q5, and Q6 to the collector of the controlled current drain transistor Q7.

An epitaxial field effect transistor Q10 has its source-drain circuit across the collector-emitter circuit of transistor Q6. FET Q10 functions as a very large resistance permitting a start up current to flow when a voltage is first applied across the output terminals Tp and Tn to enable the circuit to regeneratively drive itself into conduction at the current levels previously described.

In one very important aspect of the present invention, the gate of the field effect transistor Q10, which is the integrated circuit chip substrate, floats above the voltage of the negative terminal Tn and is connected through a resistor R3 to the collector of controlled current transistor Q7. Accordingly, all substrate (i.e., isolation pocket) leakages go through resistor R3 and transistor Q7 and are compelled to become components of the controlled output current $I_T$, along with the bias current through transistors Q5 and Q6. Accordingly, the substrate leakage currents do not erroneously affect the output current and the temperature range of circuit 20 is extended past the point at which leakage currents become significant. The purpose of resistor R3 is to isolate the substrate capacitances from the bases of transistors Q1, Q2 and Q7. By feeding the chip substrate leakage currents through a controlled current transistor Q7, as explained above, linearity has been obtained over wide temperature ranges. For example, a circuit constructed in accordance with FIG. 3 has provided output currents which are linear to within one degree centigrade in a temperature range of $-125°$ C. to $+200°$ C.

Circuit 20 of FIG. 3 includes emitter resistors R5 and R6 for developing currents corresponding to the difference in base-to-emitter voltages of transistors Q1 and Q2. The output current $I_T$ is given by $$I_T = \left(\frac{3k}{q} \ln r\right) \frac{T}{R6 - 2R5}$$

In a circuit where r is selected to be 8, then $$I_T = 528 \times 10^{-6} \frac{T}{R6 - 2R5}$$

To provide an output current which varies, e.g., one microampere per degree Kelvin, then R6 - 2R5 must be selected to be 528 ohms.

The resistances R5 and R6 must have a low temperature coefficient to preserve linearity, and preferably are formed as SiCr thin film resistors with very low temperature coefficients. Such resistances typically have negative temperature coefficients on the order of 50 ppm/°C., and the negative temperature coefficient of these thin film resistors is counterbalanced by the positive temperature coefficient of the aluminum interconnect on the integrated circuit chip. A small section of aluminum resistance in series with the thin film resistance yields a total temperature coefficient differing very little from the ideal temperature characteristic.

The thin film resistors R5 and R6, which typically have a resistance of 400 ohms per square, can be trimmed with a laser for purposes of calibration of the output current $I_T$. Since the effective resistance is R6 - 2R5, bipolar trimming is possible and calibration trims to better than 0.5° C. in accuracy have been experienced.

Figure 4:
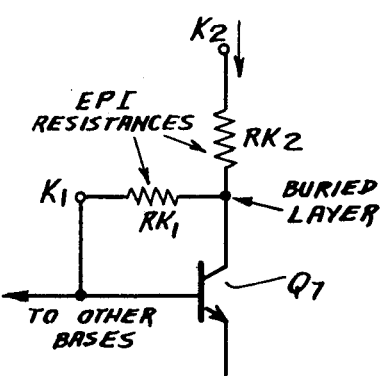
FIG. 4 is a schematic diagram of the connections of one of the transistors of the circuit of FIG. 3.

FIG. 4 illustrates an arrangement of diode connected NPN transistor Q7 to achieve improved performance by preventing premature saturation of the transistor at high temperatures. As shown, transistor Q7 is provided with two separate collector contacts K1 and K2, contact K1 being connected to the bases of transistors Q1, Q2 and Q7, and contact K2 being connected to resistors R3 and R4. The illustrated resistances RK1 and RK2 represent the buried layer to N+ collector contact resistances of the epitaxially formed integrated circuit for the two collector contacts. This arrangement insures that the buried layer voltage is always greater than the base voltage and prevents premature saturation at high temperatures. A similar double collector arrangement is provided for diode-connected PNP transistor Q8.

Figure 5:
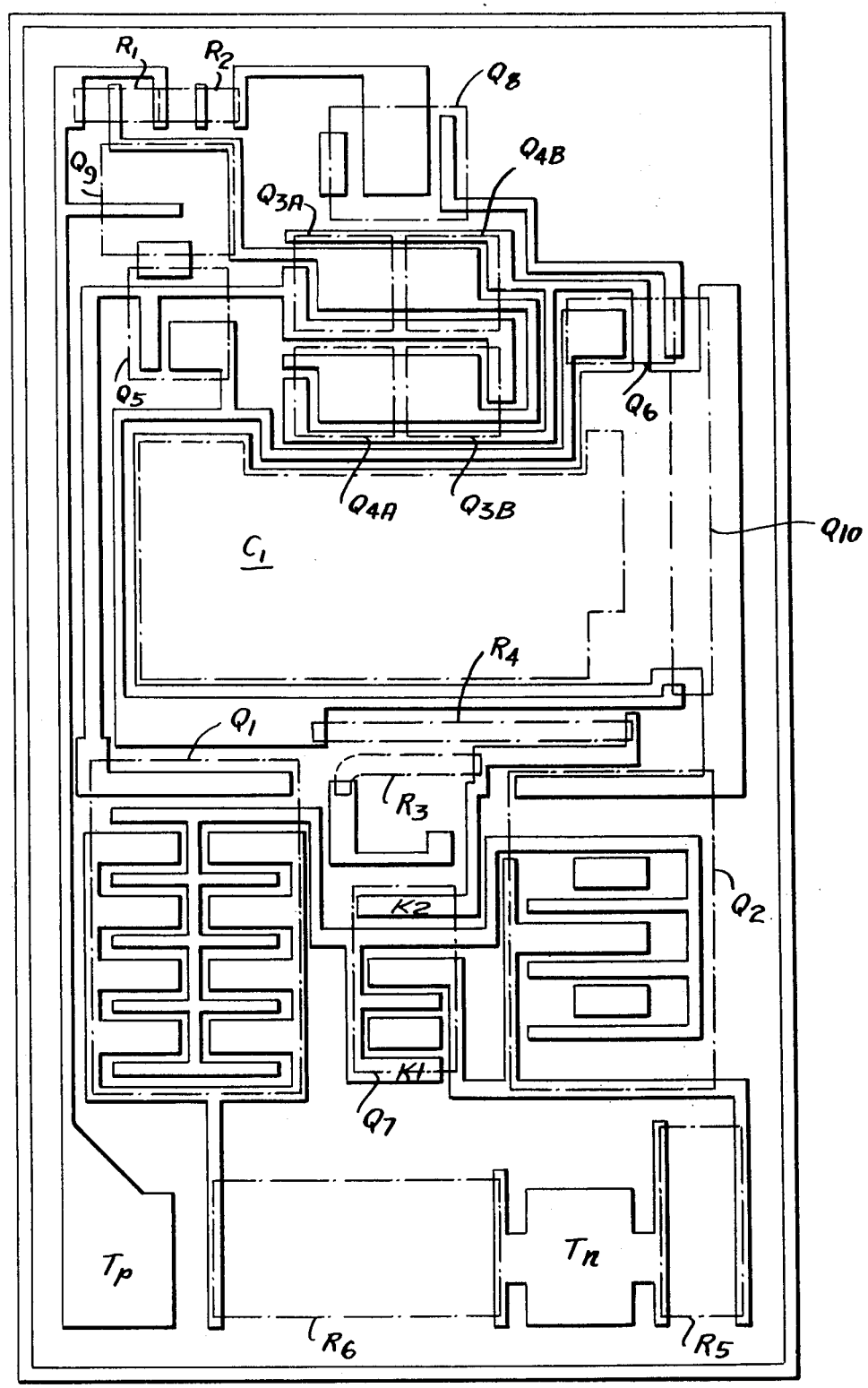
FIG. 5 is a diagram illustrating the layout of the components of the circuit of FIG. 3 upon an integrated circuit chip.

FIG. 5 illustrates the layout of an integrated circuit chip using the circuit arrangement of FIG. 3, and with transistor Q7 arranged with a double collector contact as shown in FIG. 4. The symmetry of the chip layout mirrors the symmetry of the circuit itself, and achieves not only the usual emitter matching and resistor matching, but also achieves matching of leakage and substrate effects and balances the effects of any temperature gradients. In FIG. 5, the connectors are shown in solid lines, and the components themselves in dashed lines.

Transistors Q3A, Q3B, Q4A and Q4B are formed as a cross connected quad of lateral PNP transisors to allow them to track one another over temperature. Transistor Q8 is a lateral PNP matched to transistors Q3A through Q4B and located adjacent to them in order to have the same temperature characteristics. These five transistors, together with capacitor C1, are located in the same isolation pocket. Transistor Q8, like transistor Q7, is provided with two collector contacts on opposite ends of the collector to aid in preventing high temperature saturation. One contact is connected to the collector of transistor Q6 and the other contact is used to form the diode connection.

The differential transistors Q5 and Q6 are located symmetrically on the chip, as shown. These devices are minimum geometry NPN transistors, with Q5 in the same isolation pocket as transistor Q9, but well isolated from it. Transistor Q6 is in the same isolation pocket with one end of transistor Q10. Transistors Q3A, Q3B, Q4A, Q4B, Q5 and Q6 are the main sources of heat dissipation on the chip, and as illustrated in FIG. 5, they are arranged at the opposite end of the chip from the temperature sensing transistors Q1 and Q2.

Transistor Q1 is formed as an 8 emitter NPN transistor. Transistor Q7 has two emitters similar to those of transistor Q1 but only one of the emitters is connected. The collector contact arrangement has previously been described with reference to FIG. 4. Transistor Q2 has three emitters centered in a base box identical with that of transistor Q1 so that collector-base and collector-substrate leakages will match. To provide an 8 to 1 emitter area ratio between transistor Q1 and Q2, only the center emitter of transistors Q2 is connected. To provide a 4 to 1 ratio, the outer two emitters are connected. These connections keep the thermal center of transistor Q2 symmetrical with respect to transistor Q1.

Transistor Q10 is formed as an epitaxial FET in the pocket with transistor Q6. It is arranged to carry a minimal amount of current up to temperatures sufficiently high for leakages to take over, turning the device on. The maximum current through FET Q10 is one sixth of the total current $I_T$ at the lowest temperature at which transducer operation is desired. When this current level is exceeded, transistor Q6 turns off and the device ceases to function.

Resistors R1 and R2 are provided as thin film resistors with a ratio of 1 to 4, e.g., 260 ohms and 1.04k ohms. Resistor R3 is a thin film resistor of 5k ohms for isolating substrate capacitances from the bases of transistors Q1, Q2 and Q7. Resistor R4 is a thin film transistor of 11k ohms. A larger resistance increases the minimum acceptable supply voltage across terminals Tp and Tn, while a smaller resistance increases the necessary value of capacitor C1. Capacitor C1 is a 26pf MOS capacitor.

The use of temperature sensing transducer 20 as a digital thermometer is shown in FIG. 3 wherein a digital panel meter 30 has its +5 volt terminal connected to positive terminal Tp, with negative terminal Tn connected through a resistor Rm to the ground terminal of the meter. The meter reading is taken across HI and LO terminals connected across resistor Rm, with the resistor Rm being selected to provide an appropriate voltage change to digitally register temperature in desired units. Where the temperature transducer 20 is arranged to provide a 1 microampere per degree Kelvin signal, and where the panel meter 30 is arranged to provide a change of 1 decimal digit per millivolt input, a resistor RM of 1,000 ohms will cause the meter 30 to indicate, in degrees Kelvin, the temperature sensed by transducer 20.

From the foregoing description, several advantages of a temperature transducer constructed according to the present invention are apparent:

(a) By directing substrate leakage current through the controlled current drain transistor Q7, the temperature range of the transducer is extended considerably. For example, an integrated circuit transducer constructed according to FIGS. 3 and 5 was able to maintain a linear response to within one degree centigrade up to 200° C., which compares favorably to an upper limit of 125° C. for presently available commercial devices.

(b) The circuit can use the improved current comtrol available through, e.g., the differential pair of transistors Q5 and Q6, to equalize the currents through the first and second transistors Q1 and Q2 without at the same time introducing error currents. These results are made possible by feeding the bias currents from the control transistors through the controlled current drain transistor Q7.

(c) All current paths from the plus terminal Tp lead through forward PN diode junctions, thereby allowing the circuit to be connected to a voltage source with reversed polarity without damage.

(d) By using thin film resistors, temperature coefficients are held low and at the same time transducers can be accurately calibrated by bipolar laser trimming of resistors R5 and R6. Accordingly, the temperature transducers can be made to deliver predictable currents eliminating the need for field calibration and allowing instant interchangeability of the transducers.

(e) Since the transducer requires only a low level dc voltage supply, 5 volts being sufficient, the power requirement of the device is small. For a transducer arranged to deliver one microampere per degree Kelvin, the power consumption is only 1.5 milliwatts with a 5 volt supply at 25° C. This small power requirement means that the temperature measurement errors due to self heating are minimized. The low power consumption also makes the device suitable for remote probe applications.

(f) Because the circuit is relatively simple, small monolithic integrated circuits may be manufactured which are small enough to fit into unconventional packages usable for temperature measurement applications. For example, an integrated circuit constructed according to FIGS. 3 and 5 may be placed in a TO-52 cylindrical package with a diameter of less than 0.23 inches and a height of less than 0.15 inches.

(g) Because the circuit may be realized as a small monolithic integrated circuit, and because it has no need for high precision preamplifiers and linearization devices, it may be made inexpensively, thus making it available for a variety of temperature correction applications. It can be used, for example, to compensate individual components or subsystems within instruments or, with its small size, to compensate temperature effects of various remote probes. A variety of new applications involving temperature measurement thus become economically feasible.

Although specific preferred embodiments of the invention have been described hereinabove in detail, it is desired to note that this is for the purpose of illustrating the invention, and should not be considered as necessarily limiting of the invention, since it is apparent that those skilled in this art will be able to modify the form of the invention in many ways to meet the requirements of different applications.

We claim:

1. In a two terminal transducer for generating an output current through said two terminals varying linearly with absolute temperature by circuit means operable wholly by the current flow through said two terminals, said circuit means comprising first and second transistors having conductive areas of predetermined sizes, means connected to the collectors of the first and second transistors to supply current therethrough, means for controlling the current supplying means to control the currents through the first and second transistors to operate them at different current densities, thereby to produce different base to emitter voltages in the first and second transistors, and means responsive to the difference in the base to emitter voltages of the first and second transistors for developing currents therethrough corresponding to the difference in base to emitter voltages, the improved means for controlling currents through the first and second transistors comprising:

transistor means connected to compare the currents flowing through the first and second transistors and to control the current supply means, said transistor means carrying bias current;

means for generating a controlled current varying linearly with absolute temperature to be combined with the currents through the first and second transistors to form an output current flowing through said two terminals; and means for directing the bias current in the transistor control means through the controlled current means to compel the bias current to become a component of the controlled output current;

whereby the bias current through the transistor control means does not erroneously affect the output current.

2. An apparatus for generating a current as claimed in claim 1 wherein the means for generating a controlled current comprises a third transistor connected to have its base-to-emitter voltage follow the base-to-emitter voltage of one of the first and second transistors, whereby the third transistor will generate a current varying with absolute temperature.

3. An apparatus for generating a current as claimed in claim 1 wherein the transistor means for controlling the current supplying means comprises a differential pair of transistors having their bases connected to compare currents flowing through the first and second transistors, and having their common emitters connected to the controlled current generating means.

4. An apparatus for generating a current as claimed in claim 3 wherein the collector circuit of one of said differential pair of transistors includes current governing means arranged to carry substantially one half the current through the controlled current generating means, whereby each of the differential pair of transistors carries substantially the same bias current.

5. An apparatus for generating a current as claimed in claim 4 wherein the current supplying means includes at least one pair of transistors and wherein the collector circuit current governing means comprises a transistor connected in common with said current supplying transistors and scaled in relation thereto to carry a proportional share of the current carried thereby.

6. An apparatus for generating a current as claimed in claim 5 wherein the collector circuit of the remaining one of said pair of differential transistors includes a diode connected transistor, whereby protection against reverse polarity currents through said differential transistors is provided.

7. An apparatus for generating a current as claimed in claim 1 wherein the current supplying means includes at least one pair of transistors, the means for generating a controlled current comprises a third transistor which is diode connected and has the same conductive area of one of the first and second transistors and has its base-to-emitter circuit in parallel with the base-to-emitter circuit of the same first or second transistor, thereby to generate the same current as said first or second transistor, the transistor control means comprises a differential pair of transistors having their emitters connected in common to direct current through said third transistor, and having their bases connected to sense the currents entering the collectors of the first and second transistors, the collector circuit of one of the differential pair of transistors including a bias current governing transistor connected in parallel with the current supplying transistors and arranged to carry half the current flowing through the first and second transistors, whereby substantially equal bias currents flow through each of the differential pair of transistors.

8. An apparatus for generating a current as claimed in claim 7 further comprising a diode connected transistor in the collector circuit of the remaining one of the differential pair of transistors, whereby reverse polarity protection is provided to the differential pair of transistors.

9. An apparatus for generating a current as claimed in claim 7 further comprising frequency selective means for stabilizing the operation of the apparatus including a resistor joining the emitters of the differential pair to the third transistor and a capacitor coupling the means supplying current to the differential transistor sensing current therefrom.

10. An apparatus for generating a current as claimed in claim 7 wherein the apparatus is an integrated circuit device subject to the development of substrate leakage currents, further comprising means for directing the substrate leakage current through the controlled current generating means to compel the leakage current to become a component of the controlled current, whereby the substrate leakage current does not erroneously affect the linearity of the output current.

11. In an integrated circuit for generating an output current varying linearly with absolute temperature by means of first and second transistors having conductive areas of different sizes, means connected to the collectors of the first and second transistors for supplying current thereto, means for controlling the current supplying means to equalize the currents through the first and second transistors to operate them at different current densities, thereby to produce different base-to-emitter voltages in the first and second transistors, and means responsive to the difference in the base-to-emitter voltages of the first and second transistors for developing currents therethrough corresponding to the difference in base-to-emitter voltages, the integrated circuit being subject to development of substrate leakage currents, the improvement which comprises:

means for generating a controlled current varying linearly with absolute temperature to be combined with the currents through the first and second transistors to form an output current, and means for directing the substrate leakage current through the controlled current generating means to compel the leakage current to become a component of the output current, whereby the substrate leakage current does not erroneously affect the linearity of the output current.

12. An integrated circuit for generating a current as claimed in claim 11 wherein the controlled current generating means comprises a third transistor connected with its base and emitter in common with the base and emitter of one of the first and second transistors to develop an output current proportional to the currents through the first and second transistors.

13. An integrated circuit for generating a current as claimed in claim 12 wherein said third transistor is diode connected and has a conductive area the same as the conductive area of the first or second transistor to which it is connected in common, whereby the third transistor carries the same current as said first or second transistor.

14. An integrated circuit for generating a current as claimed in claim 13 wherein the third transistor is an integrated circuit NPN transistor formed with two collector contacts, one to the base to form said diode connection, and one to the means for directing substrate current therethrough, both of the two contacts connecting to the collector through the integrated circuit contact resistance thereby to prevent premature saturation of the third transistor at high temperature.

15. An integrated circuit for generating a current as claimed in claim 14 further comprising transistor control means for the current supplying transistors, said transistor control means carrying bias current and being connected to the third transistor to direct the bias current therethrough.

16. In an integrated circuit device of the type designed to provide a controlled output current and being subject to the development of substrate leakage currents, the improvement which comprises:

meanns for developing the controlled current; and
means for directing the substrate leakage current through the controlled current developing means to compel the leakage current to become a component of the controlled current;
whereby the substrate leakage current does not erroneously affect the controlled current.

17. An integrated circuit device designed to provide a controlled output current as claimed in claim 16 wherein the means for developing the controlled current comprises a first current developing means controlled in a predetermined manner, and a second current developing means constrained to carry the same current as the first current developing means, and wherein the substrate leakage current is directed through the second current developing means.

18. An integrated circuit device designed to provide a controlled output current as claimed in claim 17 wherein the first current developing means comprises a transistor, and wherein the second current developing means comprises another transistor having its base and emitter connected in common with the first transistor, and its collector connected to receive the substrate leakage current.

19. An integrated circuit device designed to provide a controlled output current as claimed in claim 18 wherein said second transistor is diode connected.

20. An integrated circuit designed to provide a controlled output current as claimed in claim 19 wherein said second transistor has two collector contacts each including a contact resistance, one contact being used for the diode connection, the other contact receiving the substrate leakage current.

21. An integrated circuit two terminal temperature transducer arranged to be connected to an external voltage source and to generate an output current varying linearly with absolute temperature, comprising:

first and second transistors having conductive areas of different sizes;
means in the form of at least one pair of transistors connected to the collectors of the first and second transistors for supplying currents thereto;
transistor means for controlling the current supplying transistors to equalize the currents through the first and second transistors to operate them at different current densities, thereby to produce different base-to-emitter voltages in the first and second transistors;
said transistor controlling means having bias current flowing therethrough;
resistance means responsive to the difference in base-to-emitter voltages of the first and second transistors for developing currents therethrough corresponding to the difference in base-to-emitter voltages;
a third transistor connected in parallel with said first and second transistors to develop a current therethrough varying linearly with temperature;
the currents through the first, second and third transistors being combined to form the transducer output current; and
means for directing the bias current of the transistor controlling means through the third transistor whereby the output current is not erroneously affected by said bias current.

22. An integrated circuit two terminal temperature transducer as claimed in claim 21 further comprising means for connecting the integrated circuit substrate to the third transistor for directing the substrate leakage current therethrough to compel the leakage current to become a component of the linearly varying output current through the third transistor, whereby the substrate leakage current does not erroneously affect the output current.

23. An integrated circuit two terminal temperature transducer as claimed in claim 21 wherein the connections to the transistor controlling means include diode means for protecting the controlling means against reverse polarity connections of the voltage source.

24. An integrated circuit two terminal temperature transducer as claimed in claim 23 wherein said diode means comprise diode connected transistors.

25. An integrated circuit two terminal temperature transducer as claimed in claim 21 wherein said transistor controlling means comprises a differential pair of transistors having their bases connected to sense the current through the first and second transistors, and their emitters connected together to direct current through the third transistor.

26. An integrated circuit two terminal temperature transducer as claimed in claim 25 wherein the collector circuit of one of said differential pair of transistors includes a diode connected transistor connected in parallel with the current supplying transistors to carry a proportional share of their current which is substantially one half of the current carried by said third transistor, whereby substantially equal bias currents flow through each of the differential pair of transistors.

27. An integrated circuit two terminal temperature transducer as claimed in claim 26 further comprising a diode connected transistor in the collector circuit of the remaining one of the differential pair of transistors.

28. An integrated circuit two terminal temperature transducer as claimed in claim 26 further comprising a resistive network connecting the diode connected transistor and the current supplying transistors for scaling the current therethrough.

29. An integrated circuit two terminal temperature transducer as claimed in claim 25 further comprising frequency selective means for stabilizing the operation of the transducer including a resistor between the third transistor and the differential pair of transistors, and a capacitor coupling the output of the current supplying transistors to the differential transistor sensing the current therefrom.

30. An integrated circuit two terminal temperature transducer as claimed in claim 25 further comprising a field effect transistor having its source and drain connected across the collector-emitter circuit of one of said differential pairs of transistors for supplying a starting current to begin controlled operation.

31. An integrated circuit two terminal temperature transducer as claimed in claim 21 wherein said third transistor is a diode connected transistor and has two collector contacts, one contact connecting to the third transistor base, and the other contact being connected to receive current from said transistor controlling means.

32. An integrated circuit two terminal temperature transducer as claimed in claim 31 wherein said other contact is connected through an isolating resistance to the integrated substrate, thereby to receive substrate leakage currents.

33. An integrated circuit two terminal temperature transducer as claimed in claim 21 wherein said resistance means comprises a first resistance connecting the emitter of the first transistor to a transducer output terminal, and a second resistor connecting the emitter of the second transistor to the output terminal.

34. An integrated circuit two terminal temperature transducer as claimed in claim 33 wherein said first and second resistors are trimmable thin film resistors, whereby the transducer output current may be related in a predetermined fashion to temperature by trimming one or both of said resistors.

35. An integrated circuit device including a substrate with a plurality of circuit elements formed thereon, and arranged to minimize the effect of isolation junction leakage current; said integrated circuit device comprising:

means providing a pair of terminals adapted to be connected to a source of voltage to provide for a flow of current through said terminals;

circuit means including at least one of said circuit elements connected between said terminals for controlling the magnitude of said current; and means connecting said substrate to a predetermined point of said circuit means to direct said isolation junction leakage current through said one circuit element so that the leakage current will form a part of the controlled current flowing through the device.

36. A device as claimed in claim 35, wherein said substrate is connected to a circuit point maintained at a potential between the potentials of said two terminals.

* * * * *